US008218559B2

(12) United States Patent
Vare et al.

(10) Patent No.: US 8,218,559 B2
(45) Date of Patent: Jul. 10, 2012

(54) PROVIDING BEST EFFORT SERVICES VIA A DIGITAL BROADCAST NETWORK USING DATA ENCAPSULATION

(75) Inventors: Jani Vare, Kaarina (FI); Jussi Vesma, Turku (FI); Harri Pekonen, Raisio (FI); Tommi Auranen, Turku (FI)

(73) Assignee: Nokia Corporation (FI)

( * ) Notice: Subject to any disclaimer, the term of this patent is extended or adjusted under 35 U.S.C. 154(b) by 532 days.

(21) Appl. No.: 11/748,889

(22) Filed: May 15, 2007

(65) Prior Publication Data

US 2008/0285579 A1 Nov. 20, 2008

(51) Int. Cl.
*H04L 12/28* (2006.01)

(52) U.S. Cl. .......................................................... 370/412

(58) Field of Classification Search .................. 370/412, 370/229, 230, 395.64, 389, 280, 259, 390, 370/392, 432, 473, 395.4, 498, 235, 395.42, 370/395.43, 252

See application file for complete search history.

(56) References Cited

U.S. PATENT DOCUMENTS

| | | | | |
|---|---|---|---|---|
| 5,754,783 | A | 5/1998 | Mendelson et al. | |
| 5,805,825 | A * | 9/1998 | Danneels et al. | 709/243 |
| 5,889,791 | A | 3/1999 | Yang | |
| 5,990,955 | A | 11/1999 | Koz | |
| 6,574,795 | B1 * | 6/2003 | Carr | 725/71 |
| 6,771,657 | B1 | 8/2004 | Elstermann | |
| 6,909,726 | B1 * | 6/2005 | Sheeran | 370/468 |
| 7,305,699 | B2 * | 12/2007 | Crinon et al. | 725/136 |
| 2002/0144295 | A1 * | 10/2002 | Hirata | 725/153 |
| 2003/0185243 | A1 * | 10/2003 | Klotsche | 370/498 |
| 2003/0206521 | A1 | 11/2003 | Qiao | |
| 2004/0062276 | A1 | 4/2004 | Uhlik et al. | |
| 2005/0018691 | A1 | 1/2005 | Riedl et al. | |
| 2006/0092867 | A1 | 5/2006 | Muller et al. | |
| 2007/0002870 | A1 | 1/2007 | Pekonen et al. | |
| 2007/0002871 | A1 | 1/2007 | Pekonen et al. | |

(Continued)

FOREIGN PATENT DOCUMENTS

EP 0743795 A2 11/1996

(Continued)

OTHER PUBLICATIONS

International Search Report from International Application No. PCT/IB2008/001192 dated Dec. 19, 2008, 3 pages.

(Continued)

*Primary Examiner* — Kwang B Yao
*Assistant Examiner* — Anh Ngoc Nguyen
(74) *Attorney, Agent, or Firm* — Banner & Witcoff, Ltd.

(57) ABSTRACT

In accordance with an embodiment, a best-effort service is divided into packets for best-effort digital broadcast transmission. The packets are encapsulated with an encapsulation protocol that uses a packet order defining field. The encapsulated packets are inserted into an unused portion of a slot of a digital broadcast transmission frame. Then, the encapsulated packets are repeatedly inserted into the unused portion of the slot of the digital broadcast transmission frame in a packet-carousel fashion. And the transmission frame is digitally broadcast. In accordance with an embodiment, a digital broadcast transmission is received. Encapsulated packets that have been repeatedly broadcast in a packet-carousel fashion are accessed from a best-effort portion of a digital broadcast transmission frame slot. And a best-effort service is composed from the encapsulated packets by combining the encapsulated packets in an order based on a packet order defining field of the encapsulated packets.

32 Claims, 16 Drawing Sheets

U.S. PATENT DOCUMENTS

| | | | |
|---|---|---|---|
| 2007/0147409 A1 | 6/2007 | Kallio et al. | |
| 2009/0016338 A1 * | 1/2009 | Radulescu | 370/389 |

FOREIGN PATENT DOCUMENTS

| | | | |
|---|---|---|---|
| EP | 1069711 A1 | 1/2001 |
| EP | 1294139 A2 | 3/2003 |
| GB | 2403630 A | 1/2005 |
| GB | 2408433 A | 5/2005 |
| WO | 95/24088 A | 9/1995 |
| WO | 0039947 A2 | 7/2000 |
| WO | 0147281 A2 | 6/2001 |

OTHER PUBLICATIONS

ETSI EN 302 304 V1.1.1, Digital Video Broadcasting (DVB); Transmission Systems for Handheld Terminals (DVB-H).

Broadcast Engineering Basics, http://www.interactiveweb.org/tutorial/dtv-intro/dtv-transmission.shtml, pp. 1-10, printed Dec. 22, 2005.

Levin, P.A., Nuts and Bolts of Datacasting Over MPEG-2, Logic Innovations, pp. 1-6, http://www.logici.com/docs/Nuts%20&%20Bolts.htm, printed Dec. 22, 2005.

Rhodes & Schwarz FTK GmbH, "Web Over DTV," pp. 1-3, http://wireless,ictp.it/school_2005/download/rhodeschwarz/webover-e.pdf.

"Channel-Carrying Capacity of DBS Systems, Prepared for America's Public Television Stations," Strategic Policy Research, 18 pages, Nov. 17, 2000.

ETSI EN 300 468 V1.7.1, Digital Video Broadcasting (DVB); Specification for Service Information (SI) in DVB Systems.

* cited by examiner

Every second slot inspected in the 'express mode' = {2, 4, 6, 8, 10, 12, 14, 16, 18, 20}

Every third slot inspected in the 'normal mode' = {3, 6, 9, 12, 15, 18, 21}

Every 10th slot inspected in the 'budget mode' = {10, 20}

PROVIDING BEST EFFORT SERVICES VIA A DIGITAL BROADCAST NETWORK USING DATA ENCAPSULATION

FIELD OF THE INVENTION

The invention relates to providing non-real-time services in a best-effort manner in a digital broadcast communications network.

BACKGROUND OF THE INVENTION

Digital broadband broadcast networks enable end users to receive digital content including video, audio, data, and so forth. Using a mobile terminal, a user may receive digital content over a wireless digital broadcast network.

The capacity of a wireless transmission channel, e.g., in a digital broadcasting system, can be divided between different services by using time-division multiplexing (TDM). In such a situation, each service reserves one slot from a TDM frame resulting in a fixed bit rate. The bit rate is determined by the size of the slot and the frame interval. Some services can have a variable bit rate. One example of such services is a real-time video service.

An issue arises because the TDM capacity should be reserved according to the maximum bit rate of the video service to guarantee that the stream will fit into the reserved slot. However, most of the time the reserved slots and/or the transmission frames are not completely filled resulting in wasted transmission capacity. FIG. 1 shows an example unused transmission capacity in a TDM slot and frame structure. In the example of FIG. 1, four different real time services are represented, and each service reserves one time slot per frame. As shown in FIG. 1, data fills less than the entirety of each slot, which results in unused capacity.

A potential solution to the unused capacity issue is to use the unused capacity from the real time services for one ore more non-real time services, such as, a file carousel. However, this leads to another problem.

Typically, broadcasting networks have a signaling method that indicates to receivers when the services, either real time or non-real time, are being broadcast (i.e., are "on the air"). One example of such signaling is the Electronic Service Guide (ESG) in IP Datacast (IPDC) over DVB-H network. FIG. 2 is a schematic diagram of an example IPDC over DVB-H system where services include real time video services and non-real time services in a file carousel. In this case, the non-real time services reserve a fixed bit rate and do not use the unused capacity. This makes it possible to use an ESG to send start and end times of the files.

In a file carousel, where files are sent repeatedly on the same channel, the start and end times for each file can be calculated from the constant bit rate of the channel and the sizes of the files. These start and end times are then signaled in the ESG such that the receiver does not have to stay on all the time, but can save power and switch on just before the desired file is transmitted.

Another issue arises when the unused capacity from the real time services is utilized in a file carousel. That is, it is impossible to calculate when a particular file is on the air. This is caused by the fact that the bit rate is no longer constant, but changes in an unpredictable (random) manner.

More efficient ways of digitally broadcasting best-effort services would advance the art.

BRIEF SUMMARY OF THE INVENTION

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the more detailed description below.

In accordance with an embodiment, a best-effort service is divided into packets for best-effort digital broadcast transmission. The packets are encapsulated with an encapsulation protocol that uses a packet order defining field. The encapsulated packets are inserted into an unused portion of a slot of a digital broadcast transmission frame. Then, the encapsulated packets are repeatedly inserted into the unused portion of the slot of the digital broadcast transmission frame in a packet-carousel fashion. And the transmission frame is digitally broadcast. In accordance with an embodiment, a digital broadcast transmission is received. Encapsulated packets that have been repeatedly broadcast in a packet-carousel fashion are accessed from a best-effort portion of a digital broadcast transmission frame slot. And a best-effort service is composed from the encapsulated packets by combining the encapsulated packets in an order based on a packet order defining field of the encapsulated packets.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

Figure 1:
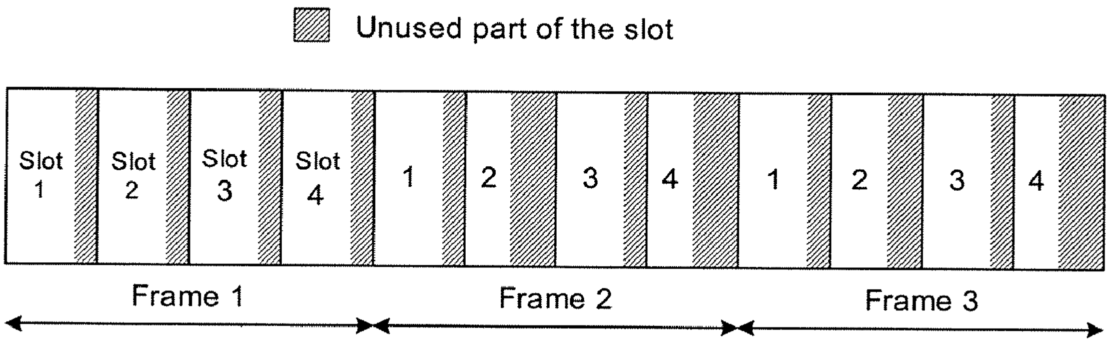
FIG. 1 shows an example unused transmission capacity in a TDM slot and frame structure.
Figure 2:
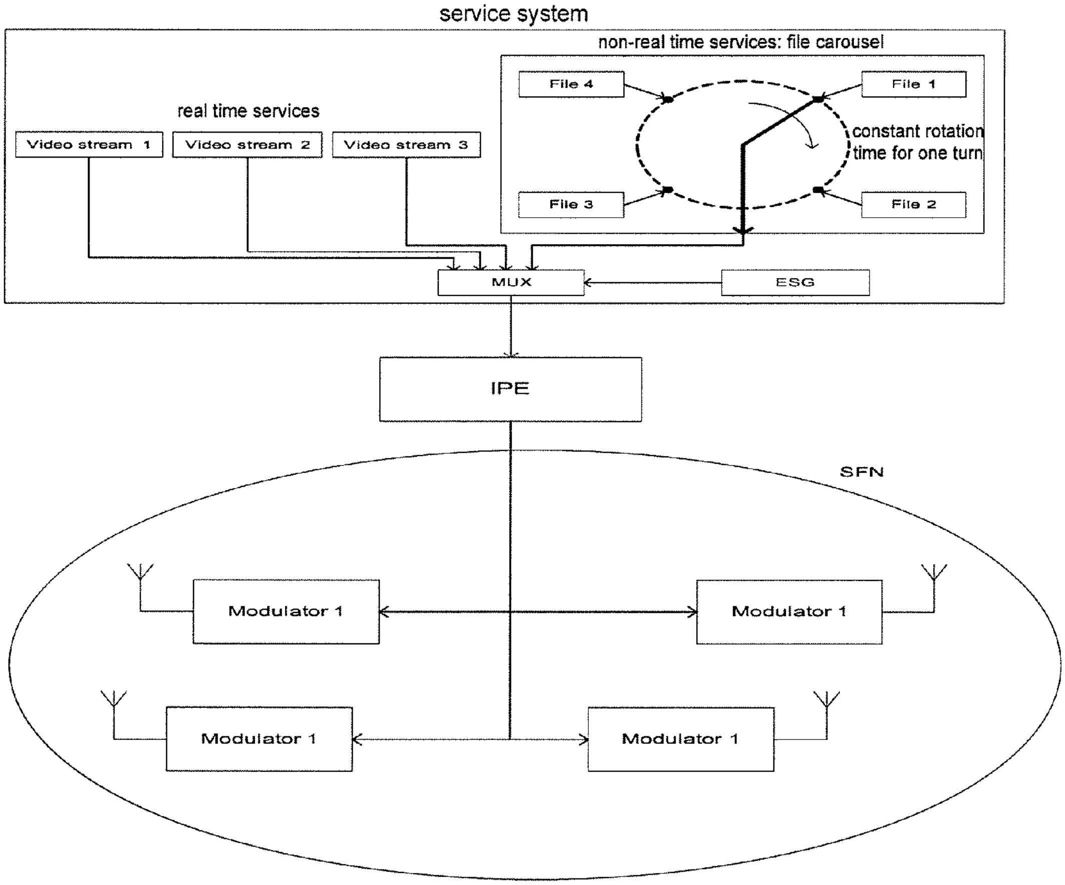
FIG. 2 is a schematic diagram of an example IPDC over DVB-H system where services include real time video services and non-real time services in a file carousel.
Figure 3:
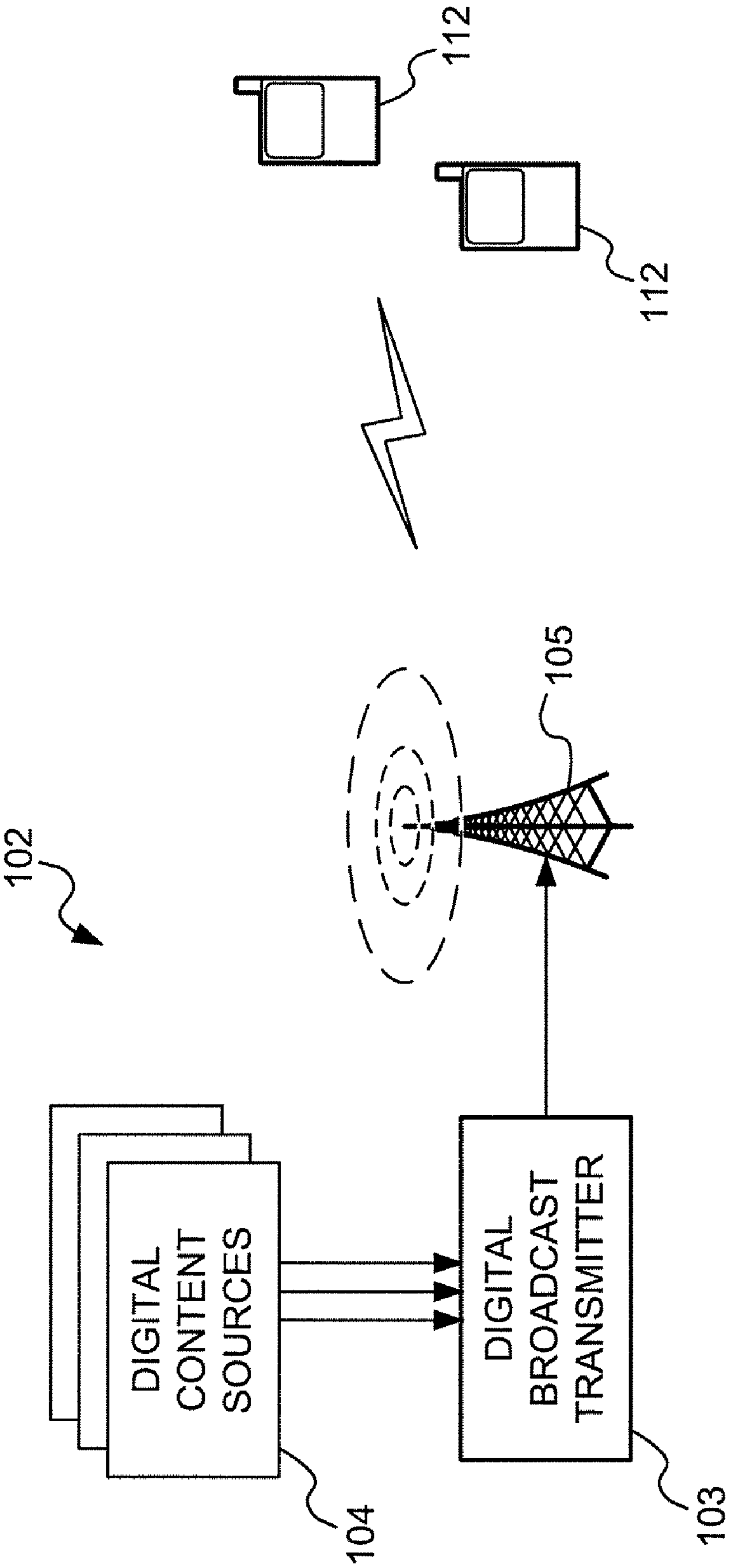
FIG. 3 illustrates a suitable digital broadband broadcast system in which one or more illustrative embodiments may be implemented.

FIG. 3 illustrates a suitable digital broadband broadcast system 102 in which one or more illustrative embodiments may be implemented. Systems such as the one illustrated here may utilize a digital broadband broadcast technology, for example Digital Video Broadcast-Handheld (DVB-H) or next generation DVB-H networks. Examples of other digital broadcast standards which digital broadband broadcast system 102 may utilize include Digital Video Broadcast-Terrestrial (DVB-T), Digital Video Broadcast-Satellite services to Handheld (DVB-SH), Integrated Services Digital Broadcasting-Terrestrial (ISDB-T), Advanced Television Systems Committee (ATSC) Data Broadcast Standard, Digital Multimedia Broadcast-Terrestrial (DMB-T), Terrestrial Digital Multimedia Broadcasting (T-DMB), Satellite Digital Multimedia Broadcasting (S-DMB), Forward Link Only (FLO), Digital Audio Broadcasting (DAB), and Digital Radio Mondiale (DRM). Other digital broadcasting standards and techniques, now known or later developed, may also be used. Aspects of the invention may also be applicable to other multicarrier digital broadcast systems such as, for example, T-DAB, T/S-DMB, ISDB-T, and ATSC, proprietary systems such as Qualcomm MediaFLO/FLO, and non-traditional systems such 3GPP MBMS (Multimedia Broadcast/Multicast Services) and 3GPP2 BCMCS (Broadcast/Multicast Service).

Digital content may be created and/or provided by digital content sources 104 and may include video signals, audio signals, data, and so forth. Digital content sources 104 may provide content to digital broadcast transmitter 103 in the form of digital packets, e.g., Internet Protocol (IP) packets. A group of related IP packets sharing a certain unique IP address or other source identifier is sometimes described as an IP stream. Digital broadcast transmitter 103 may receive, process, and forward for transmission multiple IP streams from multiple digital content sources 104. The processed digital content may then be passed to digital broadcast tower 105 (or other physical transmission component) for wireless transmission. Ultimately, mobile terminals or devices 112 may selectively receive and consume digital content originating from digital content sources 104.

Figure 4:
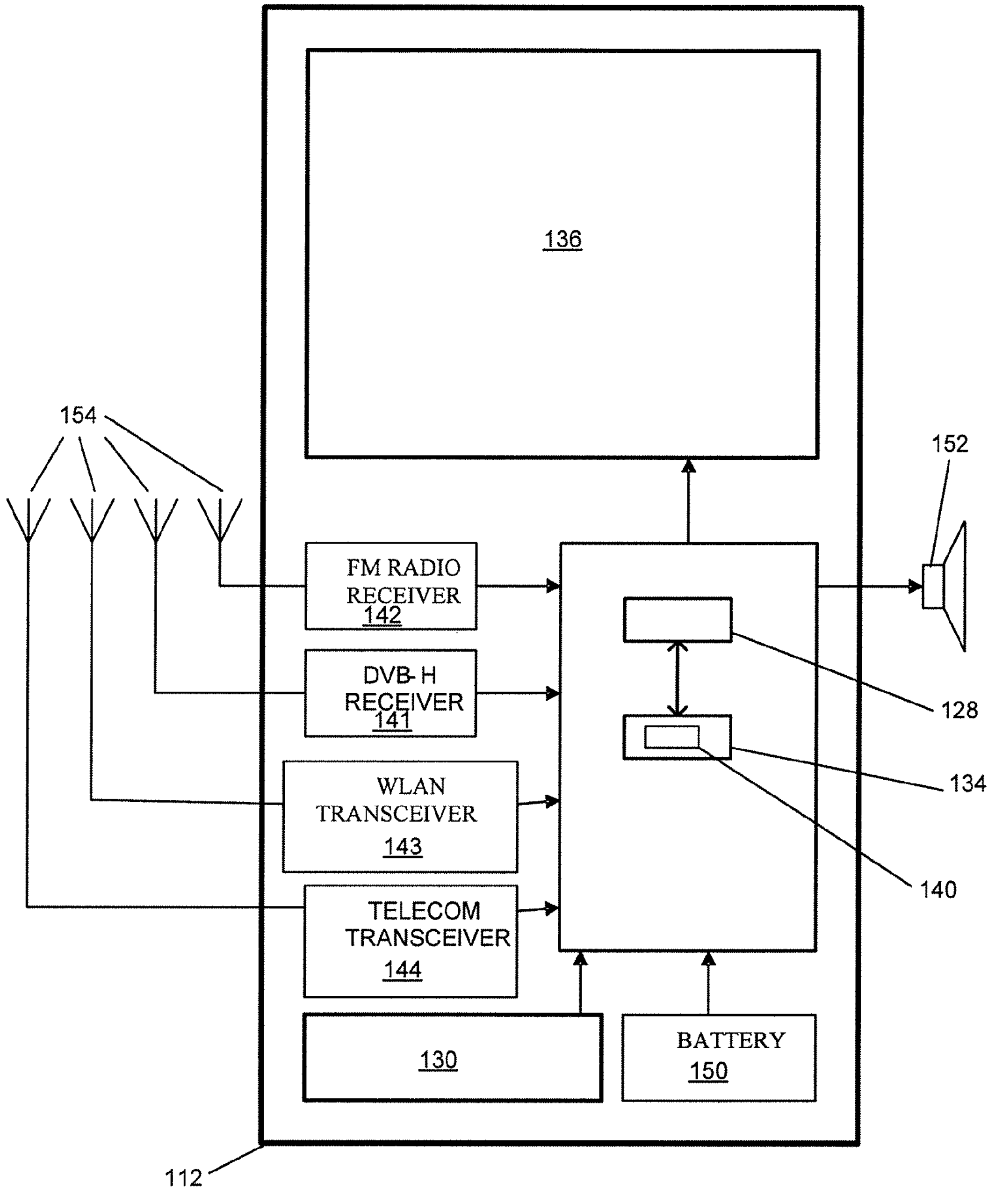
FIG. 4 illustrates an example of a mobile device in accordance with an aspect of the present invention.

As shown in FIG. 4, mobile device 112 may include processor 128 connected to user interface 130, memory 134 and/or other storage, and display 136, which may be used for displaying video content, service guide information, and the like to a mobile-device user. Mobile device 112 may also include battery 150, speaker 152 and antennas 154. User interface 130 may further include a keypad, touch screen, voice interface, one or more arrow keys, joy-stick, data glove, mouse, roller ball, or the like.

Computer executable instructions and data used by processor 128 and other components within mobile device 112 may be stored in a computer readable memory 134. The memory may be implemented with any combination of read only memory modules or random access memory modules, optionally including both volatile and nonvolatile memory. Software 140 may be stored within memory 134 and/or storage to provide instructions to processor 128 for enabling mobile device 112 to perform various functions. Alternatively, some or all of mobile device 112 computer executable instructions may be embodied in hardware or firmware (not shown).

Mobile device 112 may be configured to receive, decode and process digital broadband broadcast transmissions that are based, for example, on the Digital Video Broadcast (DVB) standard, such as DVB-H or DVB-T through a specific DVB receiver 141. The mobile device may also be provided with other types of receivers for digital broadband broadcast transmissions. Additionally, receiver device 112 may also be configured to receive, decode and process transmissions through FM/AM Radio receiver 142, WLAN transceiver 143, and telecommunications transceiver 144. In one aspect of the invention, mobile device 112 may receive radio data stream (RDS) messages.

In an example of the DVB standard, one DVB 10 Mbit/s transmission may have 200, 50 kbit/s audio program channels or 50, 200 kbit/s video (TV) program channels. The mobile device 112 may be configured to receive, decode, and process transmission based on the Digital Video Broadcast-Handheld (DVB-H) standard or other DVB standards, such as DVB-Satellite for Handheld (DVB-SH), or DVB-Terrestrial (DVB-T). Similarly, other digital transmission formats may alternatively be used to deliver content and information of availability of supplemental services, such as ATSC (Advanced Television Systems Committee), NTSC (National Television System Committee), ISDB-T (Integrated Services Digital Broadcasting-Terrestrial), DAB (Digital Audio Broadcasting), DMB (Digital Multimedia Broadcasting), FLO (Forward Link Only) or DIRECTV. Additionally, the digital transmission may be time sliced, such as in DVB-H technology. Time-slicing may reduce the average power consumption of a mobile terminal and may enable smooth and seamless handover. Time-slicing entails sending data in bursts using a higher instantaneous bit rate as compared to the bit rate required if the data were transmitted using a traditional streaming mechanism. In this case, the mobile device 112 may have one or more buffer memories for storing the decoded time sliced transmission before presentation.

In addition, an electronic service guide may be used to provide program or service related information. Generally, an Electronic Service Guide (ESG) enables a terminal to communicate what services are available to end users and how the services may be accessed. The ESG includes independently existing pieces of ESG fragments. Traditionally, ESG fragments include XML and/or binary documents, but more recently they have encompassed a vast array of items, such as for example, a SDP (Session Description Protocol) description, textual file, or an image. The ESG fragments describe one or several aspects of currently available (or future) service or broadcast program. Such aspects may include for example: free text description, schedule, geographical availability, price, purchase method, genre, and supplementary information such as preview images or clips. Audio, video and other types of data including the ESG fragments may be transmitted through a variety of types of networks according to many different protocols. For example, data can be transmitted through a collection of networks usually referred to as the "Internet" using protocols of the Internet protocol suite, such as Internet Protocol (IP) and User Datagram Protocol (UDP). Data is often transmitted through the Internet addressed to a single user. It can, however, be addressed to a group of users, commonly known as multicasting. In the case in which the data is addressed to all users it is called broadcasting.

One way of broadcasting data is to use an IP datacasting (IPDC) network. IPDC is a combination of digital broadcast and Internet Protocol. Through such an IP-based broadcasting network, one or more service providers can supply different types of IP services including on-line newspapers, radio, and television. These IP services are organized into one or more media streams in the form of audio, video and/or other types of data. To determine when and where these streams occur, users refer to an electronic service guide (ESG). One type of DVB is Digital Video Broadcasting-Handheld (DVB-H). The DVB-H is designed to deliver 10 Mbps of data to a battery-powered terminal device.

DVB transport streams deliver compressed audio and video and data to a user via third party delivery networks. Moving Picture Expert Group (MPEG) has defined a technology by which encoded video, audio, and data within a single program or service is multiplexed, with other programs, into a transport stream (TS). The TS is a packetized data stream, with fixed length packets, including a header. The individual elements of a service, audio and video, are each carried within packets having a packet identification (PID) that may be unique for the service or to the components of the service. To enable a receiver device to locate the different programs and elements of a particular program within the TS, Program Specific Information (PSI) and Service Information (SI), which are embedded into the TS, are supplied. PSI/SI enables a receiver device to correctly process the data contained within the TS.

As stated above, the ESG fragments may be transported by IPDC over a network, such as for example, DVB-H to destination devices. DVB-H network may be used to transmit for example audio, video, and data streams. The destination device then determines the ordering of the ESG fragments and assembles them into useful information.

Figure 5:
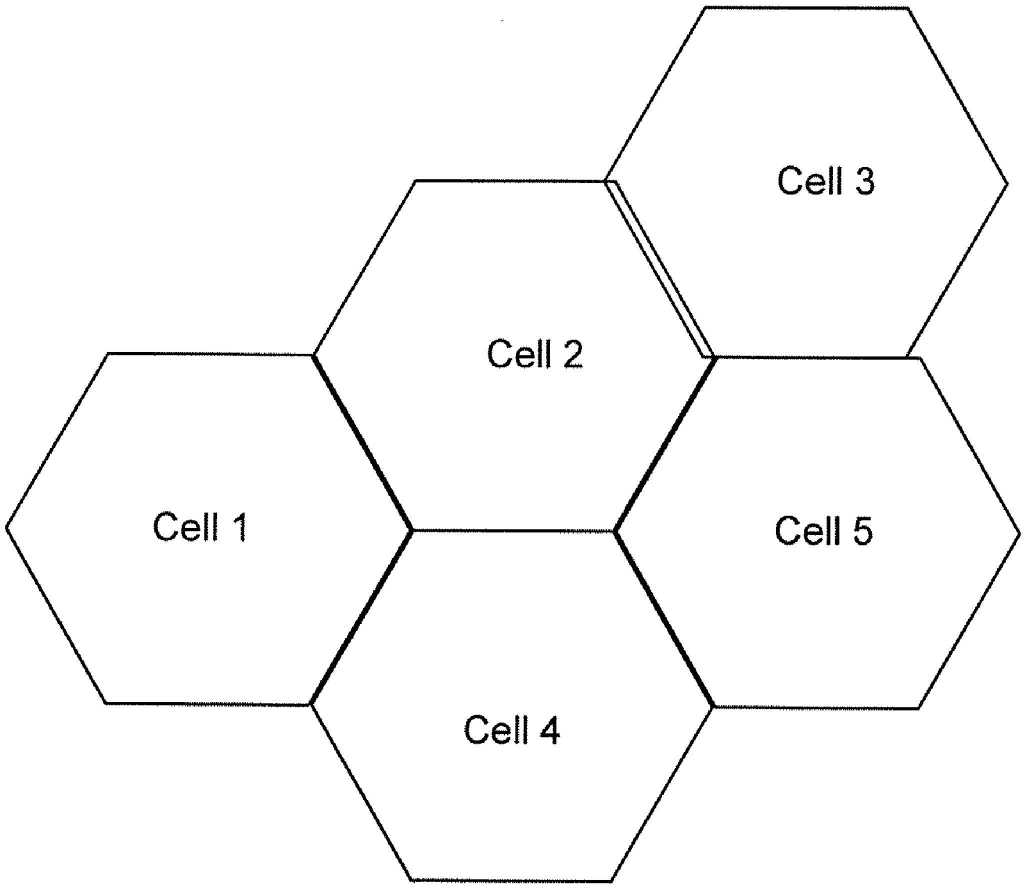
FIG. 5 illustrates schematically an example of cells, each of which may be covered by a different transmitter in accordance with an aspect of the present invention.

In a typical communication system, a cell may define a geographical area that may be covered by a transmitter or group of transmitters. The cell may be of any size and may have neighboring cells. FIG. 5 illustrates schematically an example of cells, each of which may be covered by a different transmitter. In this example, Cell 1 represents a geographical area that is covered by a transmitter for a communication network. Cell 2 is next to Cell 1 and represents a second geographical area that may be covered by a different transmitter. Cell 2 may, for example, be a different cell within the same network as Cell 1. Alternatively, Cell 2 may be in a network different from that of Cell 1. Cells 1, 3, 4, and 5 are neighboring cells of Cell 2, in this example.

Figure 6:
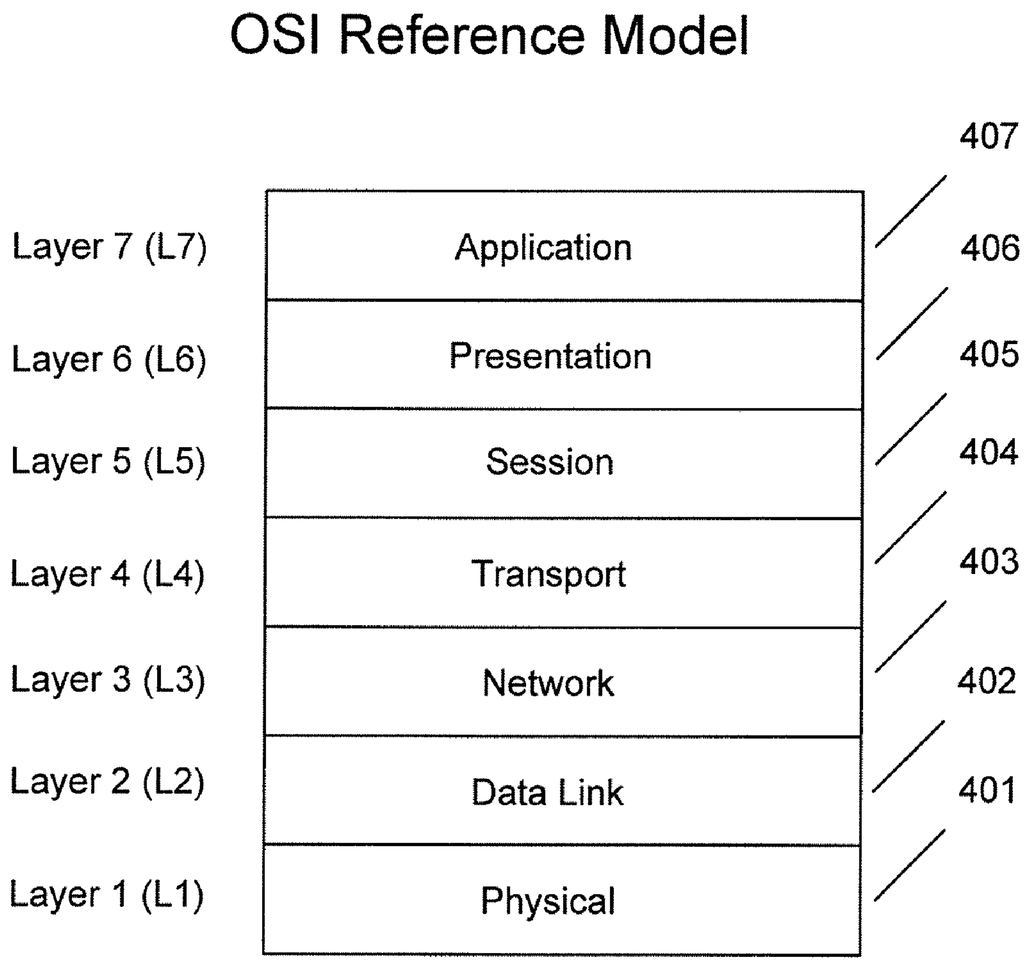
FIG. 6 illustrates the OSI reference model as containing seven layers.

Communication between network components may be accomplished via the Open Systems Interconnection (OSI) standard. The OSI framework of the process for communication between different network components may be structured as seven layers or categories as described by the OSI reference model. FIG. 6 illustrates the OSI reference model as containing seven layers. Typically, layers 4-7 pertain to end-to-end communications between message source and message destination and layers 1-3 pertain to network access. Layer 1 (401, the physical layer) deals with the physical means of sending data over lines. This may include, for example, electrical, mechanical or functional control of data circuits. Layer 2 (402, the data link layer) pertains to procedures and protocols for operating communication lines. Also, detection and correction of message errors may be accomplished in Layer 2. Layer 3 (403, network layer) determines how data is transferred between different network components. Also, Layer 3 (403) may address routing in networks. Layer 4 (404, Transport layer) pertains to defining rules for information exchange. Layer 4 (404) may also be involved in the end-to-end delivery of information within and between networks. This information may further include error recovery and flow control. Layer 5 (405, Session layer) pertains to dialog management in Layer 5 (405) and may control use of basic communications facilities provided by Layer 4 (404, transport layer). Layer 6 (406, presentation layer) pertains to providing compatible interactivity between data formats. Layer 7 (407, application layer) provides functions for particular applications services. These functions may include file transfer, remote file access and/or virtual terminals.

Aspects of the invention are directed to a method where, for each real time service reserving one slot, there may be a dedicated non-real time service, which may comprise, for example, one or more files, hereafter referred to as a "best-effort service." The unused capacity of the slot is filled with this best-effort service. In this way, underutilization of the unused capacity may be minimized.

A best effort service refers to a network service in which the network does not provide any guarantees that data is delivered or that a user is given a guaranteed quality of service level or a certain priority. In a best effort network, users obtain best effort service, meaning that they obtain unspecified variable bit rate and delivery time, depending on the current traffic load.

Examples of best-effort services include, but are not limited to: content that remains the same, such as: movies, television series provided as video clips and/or image-files (e.g. .iso, .bin etc.), software downloads and updates, images, books; and content that changes, such as: teletext services (content changing), news, audio/video clips, and magazines.

In accordance with one or more embodiments, a file is transmitted in a carouselling fashion repeatedly in the same slot. The file may be split into small packets, encapsulated with a protocol that allocates an ascending, or descending, counter for each packet or uses some other field for defining the order of packets. Hence, the packets can be received in any order. Examples of such protocols include, but are not limited to: IPv6, File Delivery over Unidirectional Transport (FLUTE), BitTorrent, and the like. Therefore, the receiver can start, at any time, accessing the slots where the desired 'best-effort service' is mapped and can receive available packets. Due to the encapsulation protocol used for encapsulating the 'best-effort service', the receiver is able to compose the complete 'best-effort service' from the packets, which may be collected in any order.

Figure 7:
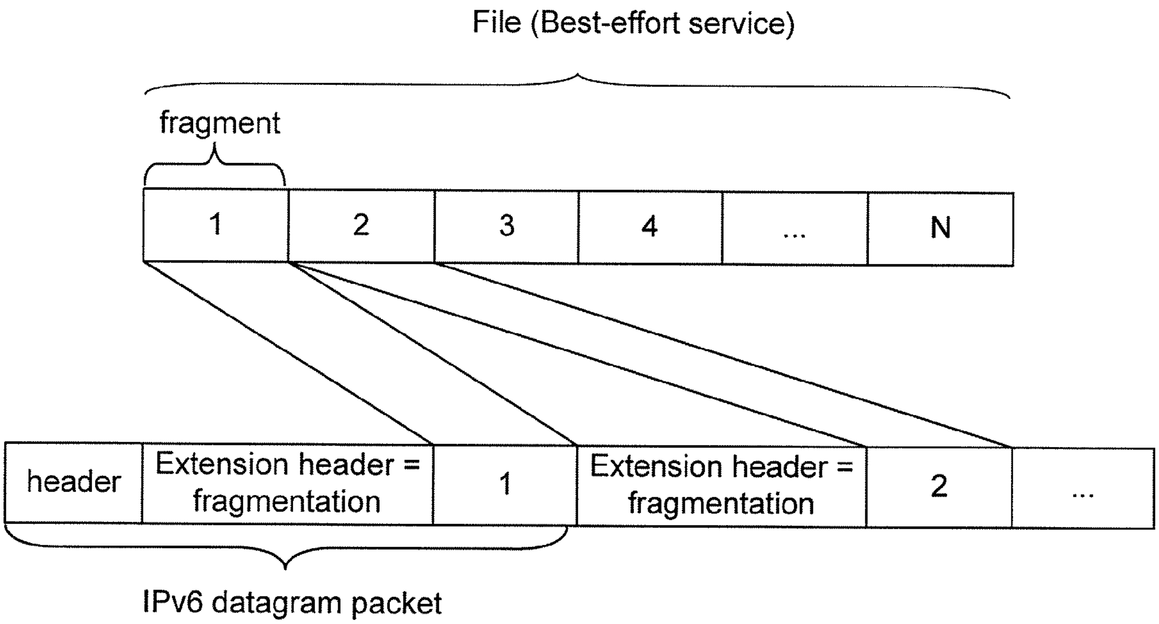
FIG. 7 illustrates an example of fragmentation of a best-effort service into several fragments in accordance with an aspect of the invention.

FIG. 7 illustrates an example of fragmentation of a best-effort service into several fragments in accordance with an aspect of the invention. In the example of FIG. 7, fragmentation of the best-effort service is achieved in accordance with IPv6 [RFC 2460 Internet Protocol, Version 6 (IPv6) Specification]. The fragments are identifiable by the receiver, regardless the order in which the fragments are received.

In accordance with the definition in RFC 2460, the Fragment header is used by an IPv6 source to send a packet larger than would fit in the path Maximum Transmission Unit (MTU) to the packet's destination. In accordance with an aspect of the invention, this would mean that the MTU would vary depending on the data available within a particular slot and would be detected by the encapsulator and/or modulator, which are discussed below.

Figure 8:
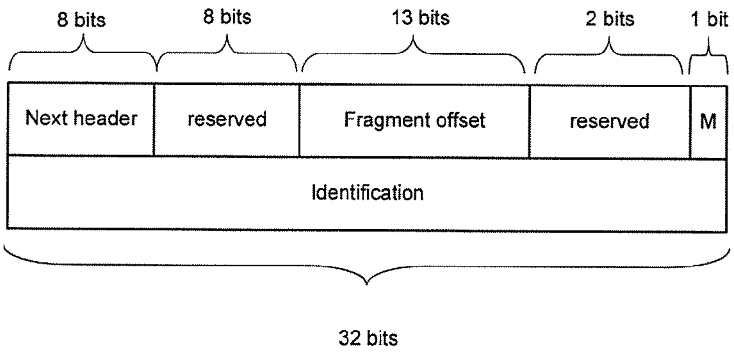
FIG. 8 shows an example syntax of an IPv6 fragmentation header in accordance with an aspect of the invention.

FIG. 8 shows an example syntax of an IPv6 fragmentation header in accordance with an aspect of the invention.

The next header field is an 8-bit selector that identifies an initial header type of a fragmentable part of the original packet (defined below). The next header field may use the same values as the IPv4 Protocol field [RFC-1700 et seq.].

The reserved 8-bit field may be initialized to zero for transmission and may be ignored on reception.

The fragment offset field may be a 13-bit unsigned integer. This field may represent an offset, in 8-octet units, of the data following this header relative to the start of the fragmentable part of the original packet.

The reserved 2-bit field may be initialized to zero for transmission and may be ignored on reception.

The M flag field may be used to indicate whether there are more fragments. For example, a value of 1 may be used to specify that there are more fragments, and a value of 0 may be used to specify that this is the last fragment.

A 32-bit Identification field may be generated by the source node for each packet to be fragmented. The value of the identification field should be different that that of other fragmented packets sent recently with the same source address and destination address. If a routing header is present, the destination address of concern is that of the final destination. In this context, "recently" means within a maximum likely lifetime of a packet, including transit time from source to destination and time spent awaiting reassembly with other fragments of the same packet. However, a source node does not need to know the maximum packet lifetime. Rather, it may be assumed to be sufficient to maintain the identification value as a simple, 32-bit, "wrap-around" counter, incremented each time a packet is fragmented. A single counter may be maintained for the node, or multiple counters, e.g., one for each of the node's possible source addresses, or one for each active (source address, destination address) combination, may be maintained.

In order to send a packet that is too large to fit in the MTU of the path to its destination, a source node may divide the packet into fragments and send each fragment separately such that the packet may be reassembled, via the received fragments, at the receiver.

Similar signalling may be used with other protocols in order to enable the carouseling of different fragments in multiple different locations and enabling a receiver to collect fragments when desired by the end user and/or allowed by the terminal configuration.

By such signalling, each fragment may be distinguished from other fragments and may be received at any time and in any order. As such, the start of the file access does not have to be synchronized to the start of the file. This results in short random access delay, which, in turn, allows files to be sent in parallel in the same frame or super frame, as is shown in FIG. 9B.

Figure 9A:
FIG. 9A shows files sent sequentially.

FIG. 9A shows files sent sequentially. If file access had to be synchronized to the start of the file, then the file duration should be short in order to have short random access delay. This would mean that the files are sent sequentially.

Figure 9B:
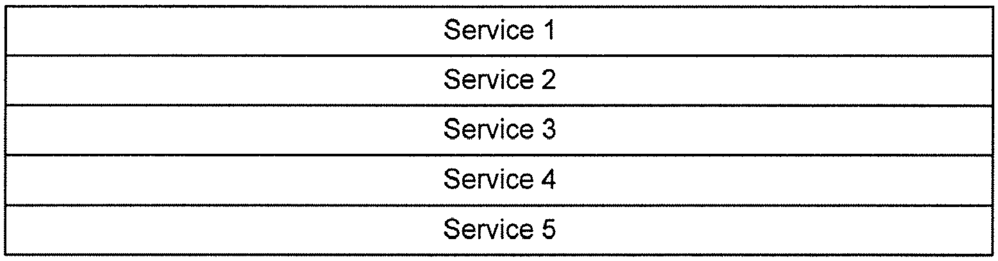
FIG. 9B shows files sent in parallel in accordance with an aspect of the invention.

In FIGS. 9A and 9B, the best-effort services use the padding capacity, and the real time services are not shown. In the example of FIG. 9B, services 1-5 are on the air continuously, and there is no need to signal the start of the file. Because of the packet numbering in the encapsulation protocol, files can be accessed at any time. Whereas, in the example of FIG. 9A, the start of the file would be signalled. Otherwise, the receiver would have to receive all of the slots all of the time. As discussed earlier, however, the signalling is relatively difficult to implement.

Figure 10:
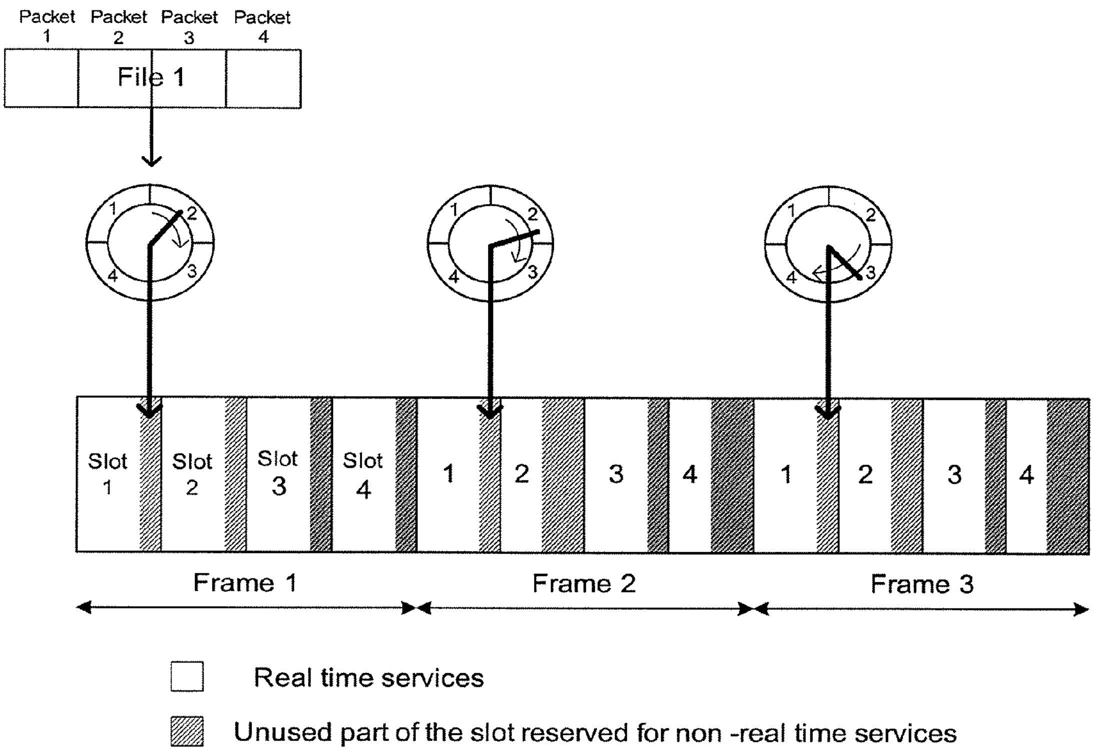
FIG. 10 shows an example how an encapsulation protocol may be used to send files in dedicated slots together with the real time services in accordance with an aspect of the invention.

FIG. 10 shows an example how an encapsulation protocol may be used to send files in dedicated slots together with the real time services in accordance with an aspect of the invention. In the example of FIG. 10, there are four real time services, which each reserve one slot from a frame. For each real time service, there is a file (also referred to as a non-real time service) utilizing the unused capacity of the slot. File 1 may be divided for example in BitTorrent or other packets that allow reassembling (four in this example). Packets are sent in slot number 1 in each frame. Once each BitTorrent packet has been sent, the transmission of BitTorrent packets is repeated, which results in a packet carousel. Similarly, BitTorrent packets of files 2, 3, and 4 (not shown in FIG. 10) are sent in slots 2, 3, and 4, respectively.

In other embodiments, there may be more than one file using the same slot. Or more than one files may use a particular slot in alternate frames. For example, file 1 may use slot 1 in odd-numbered frames (e.g., frames 1, 3, 5, etc.) and file 2 may use slot 1 in even-numbered frames (e.g., frames 2, 4, 6, etc.). Instead of one slot per frame, several slots may be used to transmit a particular file.

In other embodiments, the carouselling time per file per slot may be scheduled based on available capacity within each slot. To indicate when a file has been completely sent, there may be some feedback signalling from the modulator to the service system (or IP Encapsulator (IPE)). Also, the time consumed for carouselling a particular set of fragments of one file may be based on the service start and stop times, in a way that is similar to the case of mobileTV services and the like. Service start and stop times may be provided via an Electronic Service Guide (ESG).

In other embodiments, different service classes may be set for the best effort services. Different levels of 'availability' in the best effort slots can be defined for the services announced within an ESG. Some of the services could have higher class, indicating that a service is available more often within the best effort slots than the other services. A best-effort-service-class of this type could be signalled as one of the service description parameters within the ESG.

Figure 11:
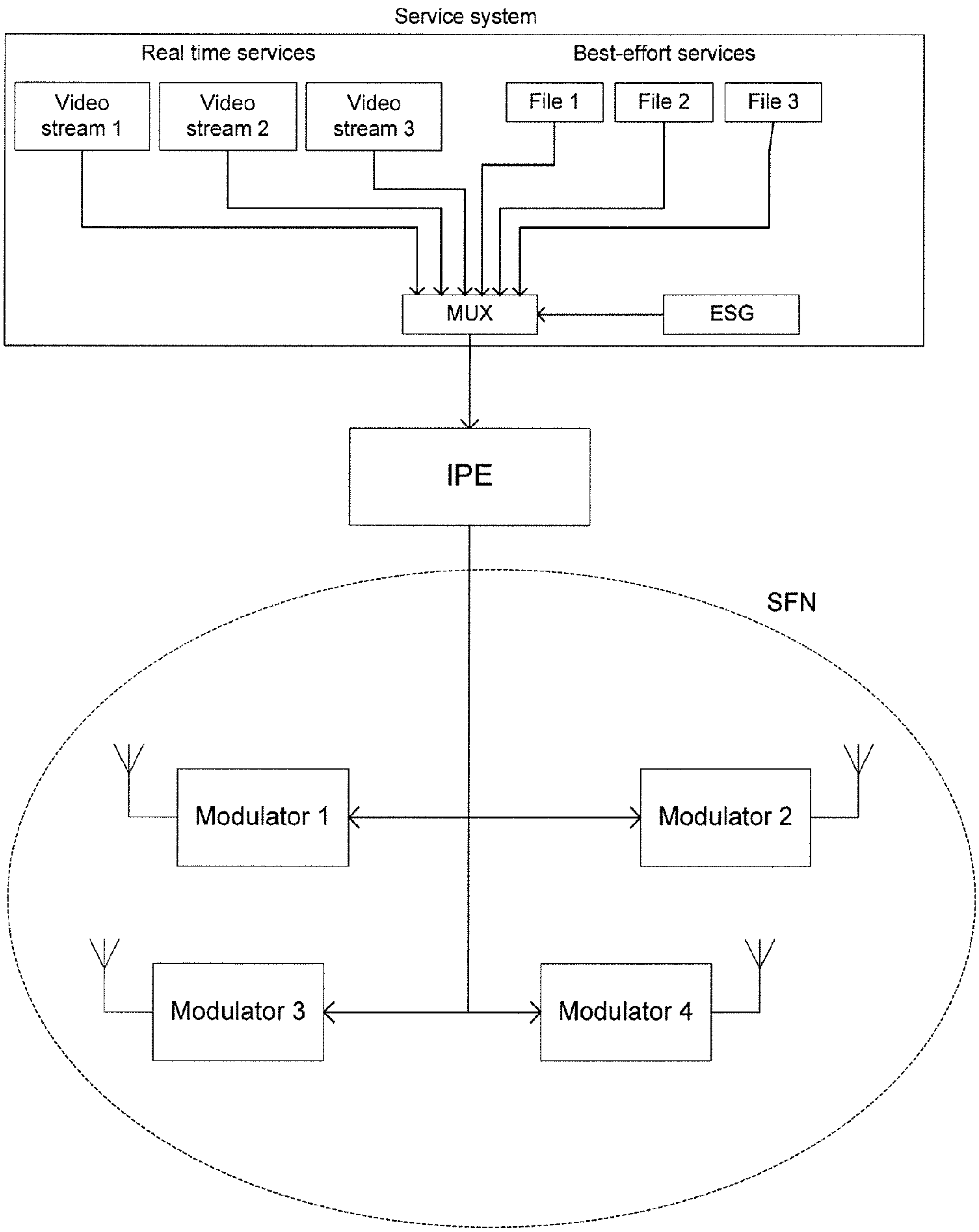
FIG. 11 is a schematic diagram of a network system for providing regular services, an ESG, and best-effort services in accordance with an aspect of the invention.

FIG. 11 is a schematic diagram of a network system for providing regular services, an ESG, and best-effort services in accordance with an aspect of the invention. As shown in FIG. 7, the real-time video streams, the best-effort file downloads, and the ESG are multiplexed and encapsulated before being modulated and broadcast on the air.

Figure 12:
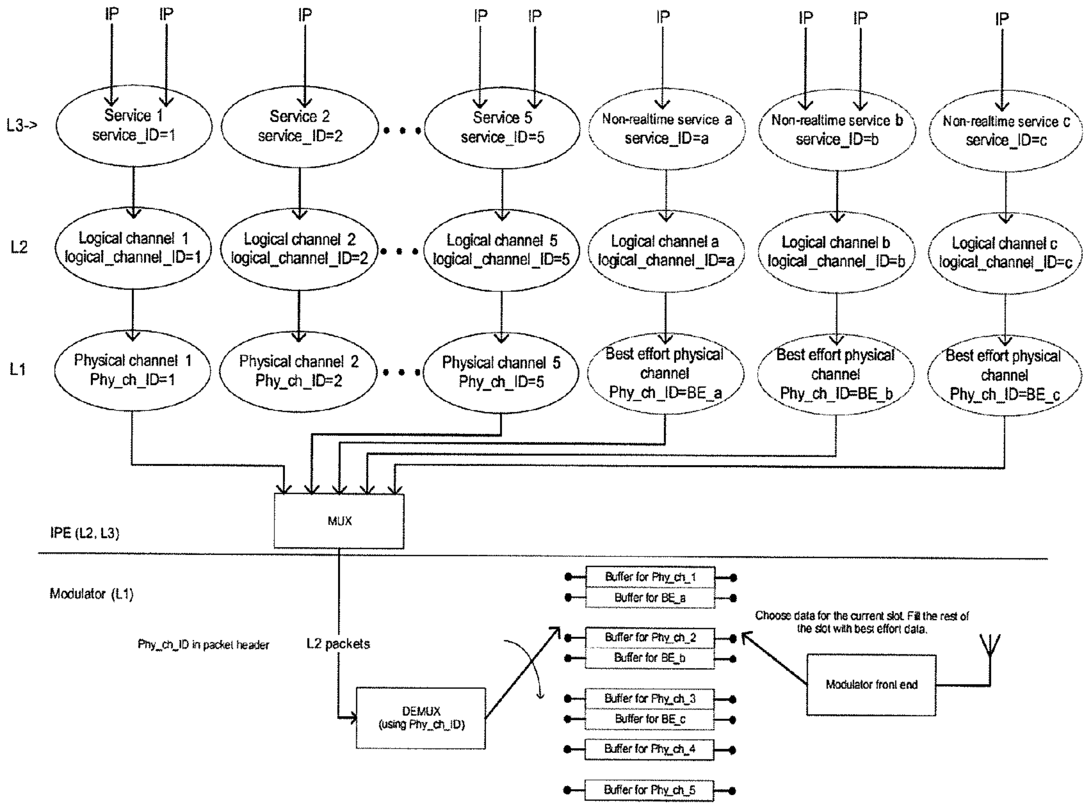
FIG. 12 is a schematic diagram that illustrates allocation of regular services and best-effort services in the network system.

FIG. 12 is a schematic diagram that illustrates allocation of regular services and best-effort services in the network system. FIG. 8 depicts that the best effort services a, b and c are mapped to their own logical channels and furthermore to their own physical channels. A physical best-effort channel may be part of the existing physical channel.

The de-multiplexer (DEMUX) block distributes the received data packets into different buffers based on the physical channel associated with each packet. Finally, the modulator fills the physical layer transmission slots of each physical channel. At first, each slot is filled with the data of the 'regular' services. In case the slots are not completely filled, the rest of the slot of a particular physical channel is filled with the data available in the best-effort buffer associated with the same physical channel.

Figure 13:
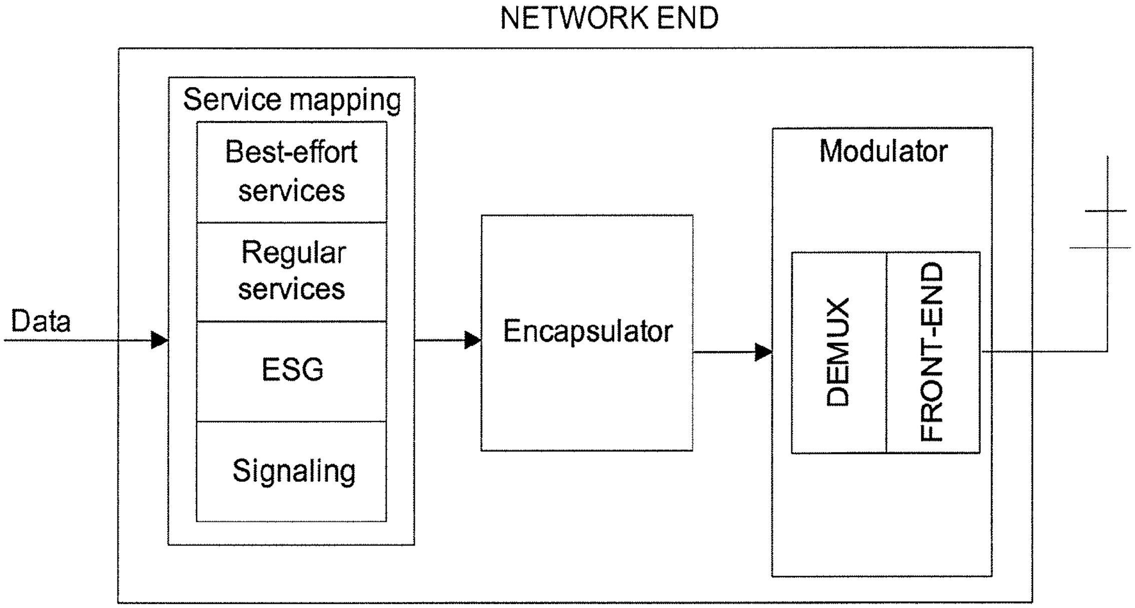
FIG. 13 is a schematic diagram of a network end in accordance with an aspect of the invention.

FIG. 13 is a schematic diagram of a network end in accordance with an aspect of the invention. Best effort service discovery is similar to that of other services, except that the service type in the ESG level enables a terminal to detect that best effort service is in question. This information can be carried either in the ESG fragments and/or within the Session Description Protocol (SDP) files. In addition, best effort services may have a category by which the availability could be determined.

Figure 14:
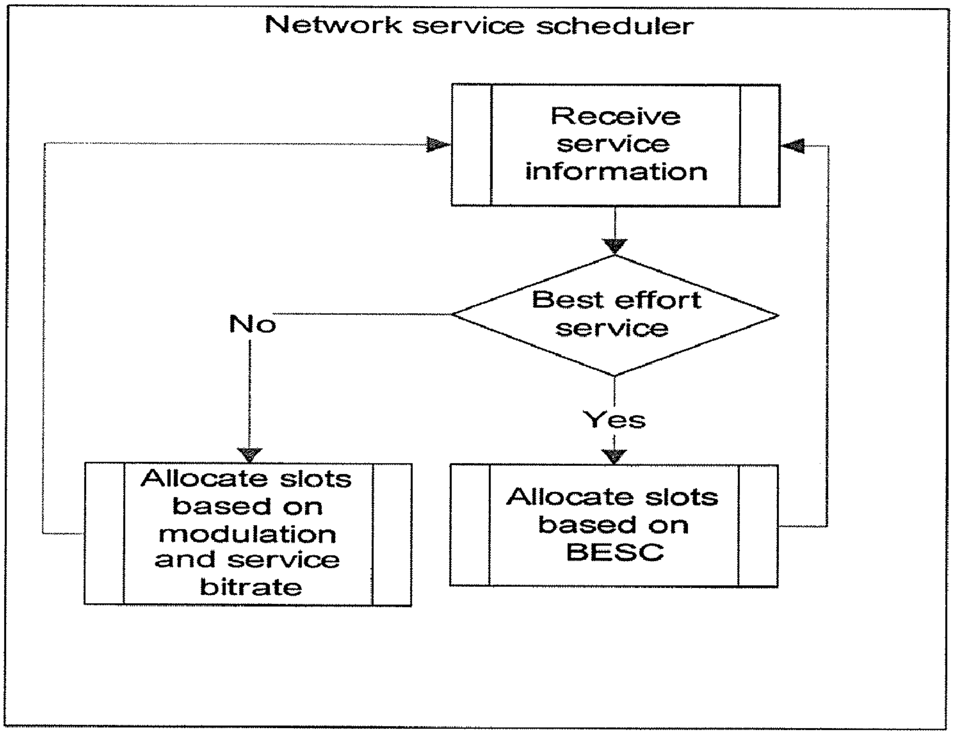
FIG. 14 illustrates an example of the network capacity allocation based on a Best Effort Service Class (BESC) in accordance with an aspect of the invention.

Such categories may be, for example, Best Effort Service Classes (BESC) A, B and C. Based on the category, a network may allocate a different number of slots where service is available when there is spare network capacity available. FIG. 14 illustrates an example of the network capacity allocation based on a Best Effort Service Class (BESC) in accordance with an aspect of the invention.

The slots for the best effort services may be allocated based on Best Effort Service Class (BESC), while the slot allocation for other services may be based on various parameters such as service bit-rate and used modulation.

Figure 15:
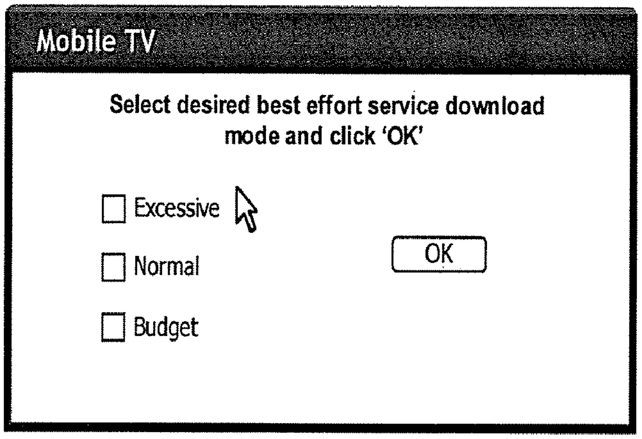
FIG. 15 illustrates an example of a user control interface in accordance with an aspect of the invention.

In the Terminal side, an end user may optimize the download time and power consumption by setting a user-configurable mode that defines how often a receiver will inspect the allocated slots. FIG. 15 illustrates an example of a user control interface in accordance with an aspect of the invention, where one of three download modes (e.g., excessive, normal, and budget) may be selected for the best effort services.

Figure 16:
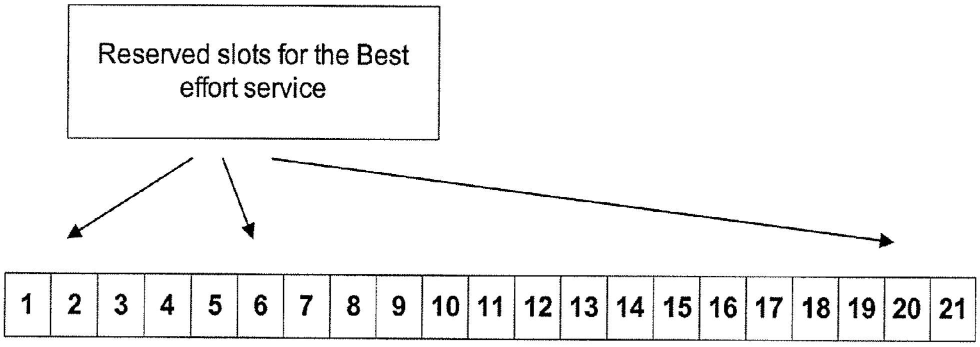
FIG. 16 illustrates an example relationship of allocated slots within the three best effort service download modes.

A configuration interface may be provided separately for each best effort service, or it may be common for all such services. Excessive mode means that receiver inspects all slots allocated for the best effort services. Normal mode inspects a bit less than excessive mode, and budget mode inspects a minimal amount of slots. The inspection criteria may be based, e.g., on the resulting extra power consumption attributable to reception of the best effort services. For example, in the excessive mode, it could mean that the receiver is on constantly until a desired service is downloaded. FIG. 16 illustrates an example relationship of allocated slots within the three best effort service download modes.

Figure 17:
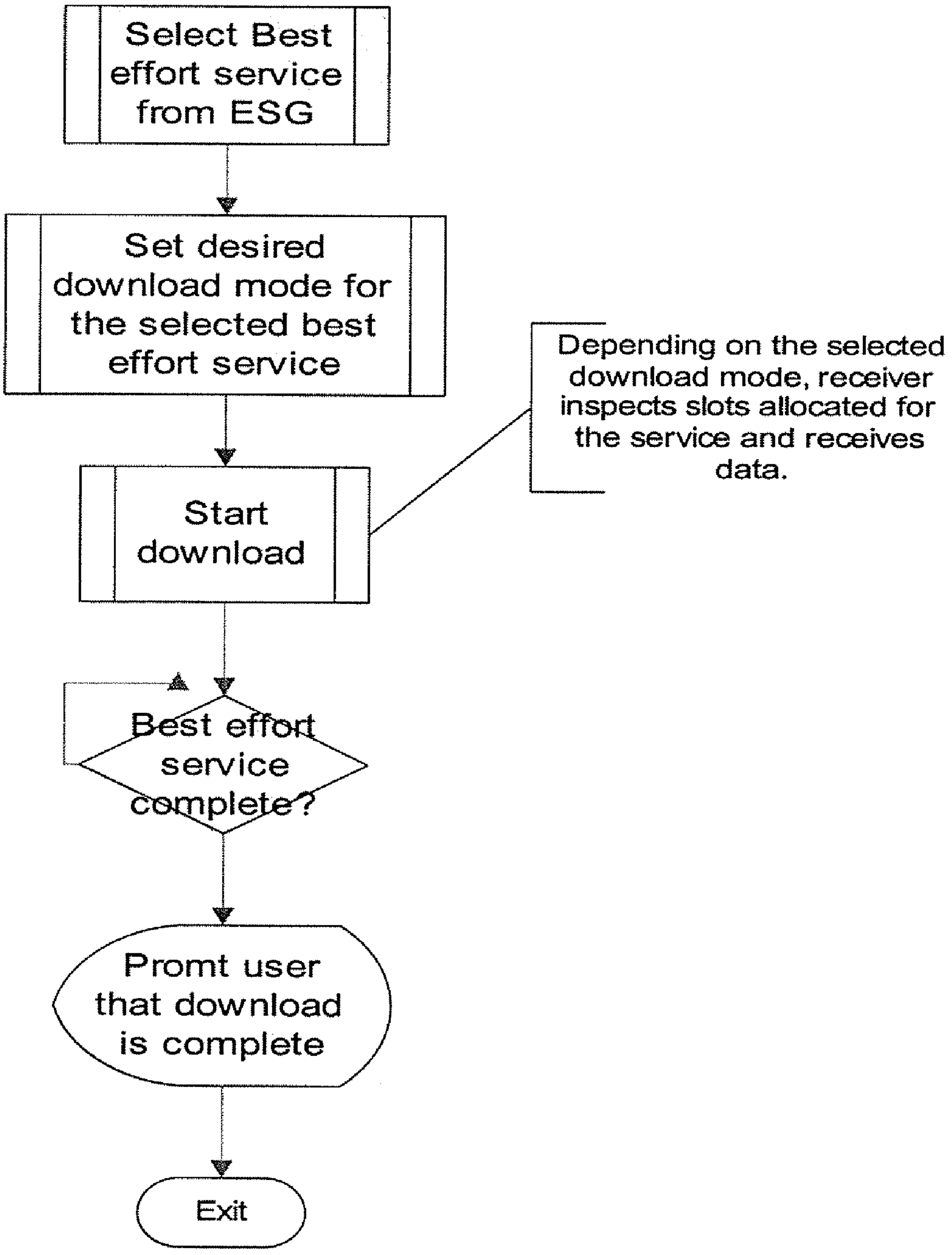
FIG. 17 is a flow diagram showing steps performed by a receiver in accordance with an aspect of the invention.

FIG. 17 is a flow diagram showing steps performed by a receiver in accordance with an aspect of the invention. As shown in FIG. 17, a best effort service may be selected from an ESG. A desired download mode may then be set for the selected best effort service. Downloading begins and, depending on the selected download mode, the receiver may inspect slots allocated for the service and may receive the data. When the best effort service download is complete, an end user may be notified accordingly.

Figure 18:
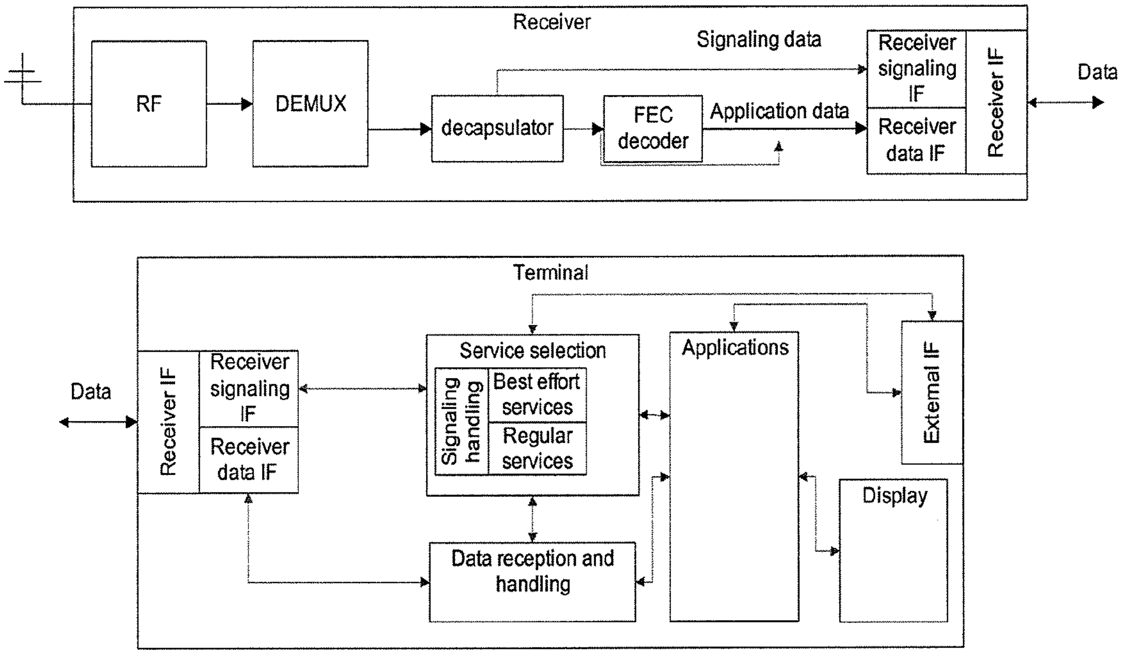
FIG. 18 is a schematic diagram of a terminal/receiver in accordance with an aspect of the invention.

FIG. 18 is a schematic diagram of a terminal/receiver in accordance with an aspect of the invention. The control interface of FIG. 15 is located in the service selection block of the terminal. The radio frequency (RF) block receives and processes broadcast data and passes it to the terminal for further processing, including combining packet fragments as discussed above, to put packets, which were fragmented for transmission as best effort services, back together.

Aspects of the invention may be used in any communication system, including, but not limited to digital broadcasting systems, where best effort services, e.g., non-real time file down load, are used to fill the unused capacity resulting from the bit rate variation of the real time services, such as, video streams.

One or more aspects of the invention may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), application specific integrated circuits (ASIC) and the like.

Embodiments of the invention include any novel feature or combination of features disclosed herein either explicitly or any generalization thereof. While embodiments have been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

We claim:

1. A method comprising:

dividing a best-effort service into fragments;

encapsulating, by a processor, the fragments with an encapsulation protocol, resulting in encapsulated best-effort packets;

inserting real time service content of one or more real time services into each slot of a transmission frame, each slot of the transmission frame being reserved for content of the one or more real time services;

in conjunction with inserting the real time service content into each slot of the transmission frame, inserting data from one or more of the encapsulated best-effort packets into an unused portion of a particular slot of the transmission frame in a packet-carousel fashion, the particular slot being reserved for content of the one or more real time services; and causing the transmission frame to be transmitted.

2. The method of claim 1, wherein the best-effort service comprises a file download.

3. The method of claim 1, wherein the encapsulation protocol is at least one of: Internet Protocol version 6, file delivery over unidirectional transport, or BitTorrent.

4. The method of claim 1, wherein the real time service content includes variable bit-rate real time digital content.

5. The method of claim 1, further comprising inserting data of encapsulated packets of a second best-effort service into an unused portion of a different slot of the transmission frame in a second packet-carousel fashion.

6. The method of claim 5, further comprising inserting data of the encapsulated packets of the second best-effort service into unused portions of one or more additional slots of subsequent transmission frames in the second packet-carousel fashion, each of the one or more additional slots corresponding to the different slot.

7. A method comprising:

receiving a transmission frame comprising a plurality of slots, wherein each slot is reserved for one or more real time services, and wherein a particular frame slot that is reserved for one or more real time services has a best-effort portion that includes data of one or more encapsulated best-effort service packets and a real time portion comprising real time service content of the one or more real time services, the data of the best-effort portion being arranged in a packet-carousel fashion;

separating, from the particular frame slot, the data of the one or more encapsulated best-effort service packets, resulting in separated best-effort data; and combining, by a processor, the separated best-effort data, resulting in assembled best-effort data for a best-effort service.

8. The method of claim 7, wherein the one or more encapsulated best-effort service packets are encapsulated according to at least one of: Internet Protocol version 6, file delivery over unidirectional transport, or BitTorrent.

9. The method of claim 7, wherein the real time portion includes variable bit-rate real time digital content.

10. The method of claim 7, wherein a slot of the transmission frame only includes best-effort service data.

11. The method of claim 7, wherein a best-effort download mode specifies how often to inspect transmission frame slots for best-effort services, and the method further comprises:

inspecting the transmission frame slots for best-effort services, wherein the inspecting includes determining whether a best-effort download for the best-effort service is complete, and wherein combining the separated best-effort data is performed in response to determining that the best-effort download for the best-effort service is complete, and wherein combining the separated best-effort data further includes combining the separated best-effort data with other best-effort data of the best-effort service.

12. The method of claim 7, wherein the assembled best-effort data for the best-effort service are packets of a file download.

13. The method of claim 7, wherein each of the one or more encapsulated best-effort service packets includes a packet order defining field.

14. An apparatus comprising:

a processor; and memory storing executable instructions configured to, with the processor, cause the apparatus to at least:

divide a best-effort service into fragments;

encapsulate the fragments with an encapsulation protocol, resulting in encapsulated best-effort packets;

insert real time service content of one or more real time services into each slot of a transmission frame, each slot of the transmission frame being reserved for content of the one or more real time services;

in conjunction with inserting the real time service content into each slot of the transmission frame, insert data from one or more of the encapsulated best-effort packets into an unused portion of a particular slot of the transmission frame in a packet carousel fashion, the particular slot being reserved for content of the one or more real time services; and cause the transmission frame to be transmitted.

15. The apparatus of claim 14, wherein the best-effort service comprises a file download.

16. The apparatus of claim 14, wherein the encapsulation protocol is at least one of: Internet Protocol version 6, file delivery over unidirectional transport, or BitTorrent.

17. The apparatus of claim 14, wherein the real time service content includes variable bit-rate real time digital content.

18. The apparatus of claim 14, wherein the memory further stores executable instructions configured to cause the apparatus to:

insert data of encapsulated packets of a second best-effort service into an unused portion of a different slot of the transmission frame in a second packet-carousel fashion.

19. The apparatus of claim 18, wherein the memory further stores executable instructions configured to cause the apparatus to:

insert data of the encapsulated packets of the second best-effort service into unused portions of one or more additional slots of subsequent transmission frames in the second packet-carousel fashion, each of the one or more additional slots corresponding to the different slot.

20. An apparatus comprising:

a processor; and memory storing executable instructions configured to, with the processor, cause the apparatus to at least:

receive a transmission frame comprising a plurality of slots, wherein each slot of the transmission frame is reserved for one or more real time services, and wherein a particular frame slot that is reserved for the one or more real time services has a best-effort portion that includes data of one or more encapsulated best-effort service packets and a real time portion that includes real time service content of the one or more real time services, the data of the best-effort portion being arranged in a packet-carousel fashion;

separate, from the particular frame slot, the data of the one or more encapsulated best-effort service packets, resulting in separated best-effort data; and combine the separated best-effort data, resulting in assembled best-effort data for a best-effort service.

21. The apparatus of claim 20, wherein the one or more encapsulated best-effort service packets are encapsulated according to at least one of: Internet Protocol version 6, file delivery over unidirectional transport, or BitTorrent.

22. The apparatus of claim 20, wherein the real time portion includes variable bit-rate real time digital content.

23. The apparatus of claim 20, wherein one of the plurality of slots of the transmission frame only includes best-effort service data.

24. The apparatus of claim 20, wherein the memory further stores executable instructions configured to, with the processor, cause the apparatus to:

operate in a best-effort download mode that specifies how often to inspect transmission frame slots for best-effort services, and inspect the transmission frame slots for best-effort services, wherein the inspecting includes determining whether a best-effort download for the best-effort service is complete, wherein combining the separated best-effort data comprises:

combining in response to determining that the best-effort download for the best-effort service is complete, and combining the separated best-effort data with other best-effort data of the best-effort service.

25. The apparatus of claim 20, wherein the assembled best-effort data for the best-effort service are packets of a file download.

26. The apparatus of claim 20, wherein the one or more encapsulated best-effort service packets each include a packet order defining field.

27. A non-transitory computer readable medium storing executable instructions that, when executed, cause a processor to at least:

divide a best-effort service into packets;

encapsulate the packets with an encapsulation protocol, resulting in encapsulated best-effort packets;

insert real time service content of one or more real time services into each slot of a transmission frame, each slot of the transmission frame being reserved for content of the one or more real time services;

in conjunction with inserting the real time service content into each slot of the transmission frame, insert data from one or more of the encapsulated best-effort packets into an unused portion of a particular slot of the transmission frame in a packet-carousel fashion, the particular slot being reserved for content of the one or more real time services; and cause the transmission frame to be transmitted.

28. The non-transitory computer readable medium of claim 27, wherein the real time service content includes variable bit-rate real time digital content.

29. The non-transitory computer readable medium of claim 27, further storing executable instructions that, when executed, cause the processor to:

insert data of encapsulated packets of a second best-effort service into an unused portion of a different slot of the transmission frame in a second packet-carousel fashion.

30. The non-transitory computer readable medium of claim 29, further storing executable instructions that, when executed, cause the processor to:

insert data of the encapsulated packets of the second best-effort service into unused portions of one or more additional slots of subsequent transmission frames in the second packet-carousel fashion, each of the one or more additional slots corresponding to the different slot.

31. The method of claim 1, further comprising:

after inserting the data of the encapsulated best-effort packets into the unused portion of the particular slot, repeatedly inserting the encapsulated best-effort packets into unused portions of slots of subsequent transmission frames in the packet-carousel fashion, wherein each of the slots corresponds to the particular slot and each of the slots is the only slot in its subsequent transmission frame that includes data of the encapsulated best-effort packets.

32. The method of claim 7, further comprising:

repeatedly receiving data of the one or more encapsulated best-effort service packets, in a packet-carousel fashion, in slots of transmission frames that correspond to the particular frame slot, wherein each of the slots that correspond to the particular frame slot is reserved for content of the one or more real time services, and wherein each of the slots that correspond to the particular frame slot is the only slot in its frame that includes data of the encapsulated best-effort packets; and accessing, from a best-effort portion of a second transmission frame slot, second data of the encapsulated best-effort service packets, the second transmission frame slot corresponding to the particular frame slot.

* * * * *